Patented Apr. 23, 1929.

1,710,505

UNITED STATES PATENT OFFICE.

CHARLES EDWARD NORTH, OF MONTCLAIR, NEW JERSEY, ASSIGNOR TO DAIRY DRINK COMPANY, OF CHICAGO, ILLINOIS, A CORPORATION OF ILLINOIS.

PROCESS FOR MAKING MIXTURES OF COCOA OR CHOCOLATE AND MILK AND PRODUCT THEREOF.

No Drawing. Original application filed August 15, 1925, Serial No. 50,485. Divided and this application filed February 9, 1926. Serial No. 87,171.

This application is a division of my application filed August 15, 1925, Serial No. 50,485, for process for making mixtures of cocoa or chocolate and milk and product thereof.

Beverages comprising a mixture of cocoa and milk or chocolate and milk have frequently been made in the home on a small scale and usually have been drunk approximately when made. Such beverages have also been made commercially on a factory scale, but, so far as I am aware, difficulties have been experienced in producing such beverages because the cocoa or chocolate has settled at the bottom of and the butter fat has risen to the top of the mixture if the same is kept for any considerable length of time. The use of milk as the greater part of such beverages naturally brings the manufacture thereof within the scope of the business of large milk dealers, but the use of cocoa is so unfamiliar to the milk industry that the preparation of the cocoa portion of the milk is largely in the hands of those more familiar with cocoa and its properties.

On a commercial scale milk and cocoa mixtures have been marketed in glass bottles. The time required for mixing, bottling, shipping and distributing the beverages may occupy a day or more. Commercially the cocoa-milk mixtures are usually cooled and designed to be consumed in a condition which is cool rather than as the hot cocoa of home production, although such commercial mixtures may be heated if desired. The time required for the manufacture of the mixtures by the milk dealer causes certain changes in the commercial product not obvious in the hot home-made cocoa-milk beverages. The mixing of the cocoa and milk or chocolate and milk, bottling and marketing of the mixtures has been performed for the most part on a commercial scale by large milk dealers as a branch of their business. The cocoa has been obtained by them in the form of a syrup which is supplied by dealers in cocoa or in cocoa-syrup. Such syrup comprises cocoa, sugar and water so mixed and proportioned that it has been only necessary to add the amount specified on the labels of the cans of syrup to the amount of whole fluid milk also specified, whereupon the syrup and the milk have been mixed, pasteurized, homogenized, cooled and bottled and marketed within a few hours or days after the bottling. Instead of using the syrup referred to as purchased on the market the milk dealer may make his own syrup, or he may make a mixture of cocoa or chocolate and milk in desired proportion in the usual way but on a commercial scale.

The most serious difficulties encountered by those promoting on a commercial scale the scales of cocoa and milk mixtures or chocolate and milk mixtures for beverages is the separation of the fat of the milk which rises to the top of the mixtures and the separation of the cocoa which falls by gravity to the bottom of the mixtures. The specific gravity of whole milk is 1.029. Since the specific gravity of milk fat is 0.960 and of cocoa 1.470 it will be apparent that milk fat is about 8% lighter than milk and cocoa is about 44% heavier than milk. As a consequence, if the mixture stands for only an hour or two a layer of milk fat can be seen on the top and a layer of cocoa on the bottom of the mixture in glass bottles. After standing over night there may be a layer as thick as an inch or more of creamy fat on top of the mixture and a layer as thick as a half inch of dark brown cocoa or chocolate at the bottom of such mixture referred to. Such separation of the fat and cocoa or chocolate from the mixtures impairs the marketability thereof. It has been proposed, as a remedy for the separation of the milk fat and cocoa or chocolate in such mixtures, to pass the mixture through a machine called a homogenizer by means of which the fat globules are broken up into such fine particles as to remain in suspension in the milk and fail to rise. Such machines are expensive to buy and to operate, as they comprise a series of heavy pumps compressing the liquid under pressures ranging from 1500 to 6000 pounds to the square inch. Such machines have no effect on the cocoa or chocolate so far as keeping it from precipitating in the mixtures is concerned for the reason that cocoa does not consist of fat globules but of starchy and fibrous material. As a consequence, the treatment of the mixtures by homogenizers still leaves the mixtures in a condition in which the cocoa quickly settles to the bottom forming a brown sediment.

The object of my invention is to so treat or prepare one or more ingredients of the cocoa-milk or chocolate-milk mixture, either before or after the mixture is made, as to prevent the rising of the fat globules chocolate-milk mixture, either before or after the mixture is made, as to prevent the rising of the fat globules to the surface and the depositing of the cocoa or chocolate at the bottom of the mixture without regard to the time of retaining the mixture for use.

In this specification I use the term "cocoa" as including commercial cocoa or chocolate or an equivalent edible solid material.

In carrying out my invention I increase the normal friction between the milk liquid or fluid and the more solid materials or ingredients of my improved beverage, such as the butter fat or the particles of cocoa, or both, to such a degree as will maintain the fat and the solid material, such as cocoa, in suspension in the liquid. I accomplish the foregoing by increasing the friction or viscosity of the milk liquid against the surfaces of the particles of fat and the particles of cocoa to such an extent that their respective motions upwards or downwards in the mixture due to their differences in specific gravity from the gravity of the liquid is overcome. The friction of the liquid against the surfaces of the particles of fat or of solid material, such as cocoa, in the mixture is in direct proportion to the viscosity of the liquid or fluid, by which I mean the thickness or stickiness or tenacity of the liquid or fluid. If the viscosity of water is represented by 1.0 the viscosity of normal fluid milk is 1.8. The thickness or viscosity of the milk fluid can be increased in several ways. Thickeners or more viscous substances can be added directly to the milk or to the cocoa-syrup or to the mixture. Such thickeners include gelatine, agar, vegetable gums, such as acacia, gum tragacanth, gum arabic, Irish moss, other gums, or a mixture of lime water and sugar, known in the trade as viscogen. The solids of the milk itself may be changed so that from a liquid form they assume a more solid form and increase the viscosity of the milk. By the application of very high heat (240° F.) and pressure (15 lbs. to the sq. in.) to milk the casein and albumen of milk may be made to assume a creamy and jelly like form. Such heat and pressure may be applied to the milk alone or to the milk and cocoa mixture of my beverage. In such ways and possibly in other ways the viscosity of milk may be increased at will and such increases in viscosity may be graduated and their effect on the rising of milk fat and the descent of cocoa in the mixture may be noted. The motion of fat particles upward and of the cocoa particles downward in a mixture of milk and cocoa is fast or slow, and such motions cannot, so far as I am aware, be brought absolutely to a standstill without an increase in viscosity so great that the liquid in which these particles is suspended is absolutely rigid, as it would be if frozen. On the other hand, however, the friction can be increased sufficiently to make the movement of the particles so slow that no separations serious enough to impair the commercial value of such mixtures will take place for days or even weeks. I have discovered the precise points at which the viscosity and hence the friction is sufficient to prevent the rising of the fat to the top of such mixtures for twenty-four hours. The point for fat is 2.2, which means 2.2 times as viscous as water. I have also discovered the degree of viscosity and hence of friction necessary to prevent the settling of cocoa to the bottom of the mixtures of cocoa and milk for twenty-four hours. This is a viscosity of 2.5, which means a viscosity of 2½ times as viscous as water.

One of the ways to increase the viscosity of the mixture is the use of vegetable gum in the cocoa-syrup itself before its use in making a cocoa-milk mixture, such as used by the milk dealer. Cocoa syrups for the purpose usually comprise dried cocoa powder or ground fiber, plus sugars of various kinds, plus sufficient water to moisten the cocoa and dissolve the sugar. A thickener comprising vegetable gum is perfectly edible and does not impair the flavor of the syrup or of the cocoa-milk mixture. The amount of vegetable gum that may be used in the cocoa-milk mixture to give the viscosity required to prevent the movement of both milk fat and cocoa is ½ of 1% of the total weight of the finished product. Since the syrup as usually marketed is of a bulk occupying 25% of the finished product the syrup may consist of

|  | Per cent. |
|---|---|
| Cocoa | 8 |
| Sugar | 16 |
| Vegetable gum | 2 |
| Water | 74 |
| Total | 100 |

In the making of such syrup the mixture containing the vegetable gum may be mixed and heated and packed in tin cans.

Among the convenient thickeners for the syrup are corn-starch, gelatine, vegetable gums, such as acacia, gum tragacanth, gum arabic, Irish moss, other gums, agar, or a mixture of lime water and sugar, known in the trade as viscogen, may be used.

Instead of the addition of a thickener, such as vegetable gum, to the cocoa-syrup such vegetable gum may be added to the milk to increase the viscosity of the milk liquid before the syrup is mixed therewith. The proportion of vegetable gum to be placed in the milk can be the same as that described with respect to the syrup. Furthermore, the cocoa and milk mixture first may be made and then the vegetable gum may be added thereto. It is preferable to agitate the mixture containing the edible thickener sufficiently to thoroughly mix the ingredients.

When the vegetable gum is added to the syrup it may be done at the factory where the syrup is made, which would make possible the sale of a syrup that would provide not only the cocoa and sweetening but also a remedy to prevent the separation of the fat and cocoa from the milk. In such case it would be necessary only for the milk dealer to add milk to the thickened cocoa-syrup and proceed with the manufacture of the beverage in the routine way.

It may be convenient for the milk dealer to buy cocoa-syrup without vegetable gum and add the vegetable gum at the time the mixture with milk is made, either by adding the vegetable gum to the syrup or by adding the vegetable gum to the milk before the mixture of syrup and milk is made. In such event the vegetable gum would be weighed out in proper proportions, melted and diluted as necessary and mixed with the syrup, or with the milk, or with the syrup and milk mixture.

While I may use one of the thickeners alone, such as vegetable gum, I may group two or more of the thickeners, in suitable proportions each to increase the viscosity of the mixture. There also may be a commercial advantage in using a combination of two or more thickeners, such as for flavor, smoothness and appearance, with or without the use of heat, or heat and pressure, which may have a relation to the formula of the ingredients used in the composition of the entire mixture. The plurality of thickeners may be separately or successively added to the milk or to the cocoa and milk mixture, or several of the thickeners may be combined and added to the milk or cocoa and milk mixture, as may be preferred. For example, fractions of 1% of each of a number of thickeners may be used to equal, say, one-half of 1% of thickener to the total weight of the finished product.

The use of heat without evaporation for increasing the viscosity of milk is novel, because two of the solids, not fat, are affected but in a peculiar way. The albumen in cow's milk amounting to .5% of the whole and 4 1/16 % of the solids is coagulated by heat of from 145° F. to 150° F. Casein which amounts to 3.5% of the whole milk and 29 1/6 % of the solids is coagulated into a jelly-like mass at temperatures from 220° F. to 250° F., which may be most conveniently produced by placing the milk in closed containers and heating the same by steam under pressure. I have found that the application of heat to milk at temperatures of 145° F. to that of boiling, (212° F.), in addition to the coagulation of albumen also affects the fat globules by breaking up their clusters, so that instead of clustering in small groups the fat globules become more evenly distributed as scattered individuals. This exposes the entire surfaces of the fat globules to the action of friction of the milk liquid and such friction is increased by the coagulation of the albumen of the milk, and as a consequence of these two factors in milk heated to from 145° F. to 212° F. the rising of fat in the form of cream is greatly diminished. There is no such effect on the cocoa in cocoa and milk mixtures because of the much greater difference between the specific gravity of cocoa and of milk and the fact that the increase in viscosity by the coagulation of milk albumen alone is not enough to prevent the falling of the cocoa fibers in the mixture. When the temperature of the milk and cocoa mixture is raised above 220° F., (in practise I use 240° F. for about thirty minutes), and the casein is coagulated into a jelly-like mass the increase in viscosity of the milk becomes so great that its friction on the cocoa fibers brings them almost to a standstill. Under such conditions motion of the cocoa fibers is so slow that they remain in suspension in the mixture for days or even weeks.

When heat alone is applied to the mixture or to the milk certain irregularities in the desired results may occur due to lack of care of the operator in controlling (a) the acidity of the mixture (b) or the period of heating (c) or the temperature and pressure which may at times fail to prevent the deposit of small amounts of cocoa fiber in the bottom of the mixture. Such irregularities can be entirely overcome if a thickener, such as vegetable gum, is added to the cocoa-milk mixture or to the milk and heat is then applied as described to the mixture or to the milk. This result is attained by the assistance of the vegetable gum by adding to the viscosity normally produced by the heat treatment. By the latter procedure desired results may be attained to prevent rising of the milk fat or the descent of the cocoa fibers in the mixture with less skill than is required by the use of heat treatment alone. The sterilizing feature of the heat treatment is a desirable adjunct in any event in order to prevent decomposition of the mixture.

For the purpose of subjecting the cocoa and milk mixtures to high temperatures and pressures the mixture may be placed in glass bottles or tins or any convenient form of container. The ordinary type of steam chest or sterilizer may be used for the purpose of heating, but for commercial purposes and to avoid excessive breakage of glass bottles I prefer to use large kettles in which the bottles containing the mixture may be submerged under water. The covers of the kettles may be bolted down against gaskets and steam under pressure from a steam boiler may be gradually injected into the kettles until the water is heated to 240° F. and the corresponding pressure attained, which pressure of about 15 lbs. to the square inch within the closed bottles or containers will be autogenous. After the containers have been subjected to the heat and pressures set forth for a desired period of time, say at 240° F. for about 30 minutes, the steam may be exhausted from the kettle, by opening a suitable valve connected therewith, and after the water in the kettle has sufficiently cooled the containers may be removed with their contents ready for use or shipment.

If preferred the milk alone may be treated by the heat and pressure described to increase its viscosity before the addition of the cocoa-syrup or the vegetable gum, and the syrup may be added to the treated milk before or after the latter has cooled to atmospheric temperature, in which case it would be preferable to suitably stir or agitate the mixture.

The effect of such high temperature and pressure as 240° F. and 15 lbs. to the square inch for a period of about thirty minutes is not only to change the nature of the albumen and casein and increase the viscosity of milk but also serves to kill all bacteria, yeasts and moulds in such mixtures. In short, the high temperatures and pressures sterilize these mixtures and by sterilization entirely remove their perishability so far as the growth of micro-organisms is concerned. As a consequence when proper care is taken to provide containers which are sealed so as to permit no risk of contamination the cocoa-milk mixtures so made not only do not separate but also do not decompose.

The manufacturer may, however, heat milk or skim milk containing the vegetable gum in open vessels such as pails, or cans, or tanks, placing these in steam pressure chests such as those employed in the canning industry and after heating the contents to 240° F. at a pressure of 15 lbs. to the square inch for between twenty-five and thirty minutes he may then remove the milk from the pressure chest and mix cocoa or chocolate, the vegetable gum and sugar with the same and place the mixture in his final containers, such as cans and bottles. By such practice he would obtain mixtures which will not separate but would sacrifice some of the advantages of sterilization and keeping qualities for a wider choice of containers and of closures for the same.

If preferred the cocoa-syrup containing the vegetable gum may be mixed with the milk before the latter is subjected to the heat and pressure described, or the vegetable gum may be added to the milk before the cocoa-syrup is added and then such mixture may be subjected to such heat and pressure.

The proportions of milk and cocoa-syrup suitable for a beverage may be three quarts of milk to one quart of cocoa-syrup including the proportion of vegetable gum before referred to. The addition of a thickener alone (such as vegetable gum) to a cocoa-milk mixture will effectively prevent the separation and the settling of cocoa in such mixtures. But without the sterilizing effect of heat such mixtures are perishable as they will be decomposed in a few days by the action of micro-organisms.

Having now described my invention what I claim is:—

1. That step in the process of producing fluid cocoa-milk mixtures which consists in the addition of vegetable gum and the application of heat to the mixture to increase the viscosity of the fluid to such an extent that by its friction on their surfaces the cocoa fibers remain in suspension.

2. That step in the process of producing fluid cocoa-milk mixtures which consists in the addition of vegetable gum to the mixture to increase the viscosity of the fluid to such an extent that by its friction on their surfaces the cocoa-fibers remain in suspension, and heating the mixture to a temperature of about 240° F. at a pressure of about 15 lbs. to the square inch for a period of about thirty minutes to aid in maintaining the milk fat and the cocoa particles in suspension and preserve the mixture from decomposition.

3. The process of making a fluid beverage comprising milk, cocoa and vegetable gum which consists in subjecting the mixture to temperature and pressure treatment to coagulate the milk, the thickening produced by the temperature and pressure treatment and by the vegetable gum being correlated so that the combined viscosity of the coagulated milk and vegetable gum is sufficient to hold substantially all the cocoa particles in suspension.

4. A fluid beverage comprising cocoa, milk and vegetable gum in which the milk is in a coagulated condition as a result of heat and pressure treatment and in which the combined viscosity of the coagulated milk and the vegetable gum is sufficient by the friction on their surfaces to hold substantially all the cocoa fibres in suspension.

CHARLES EDWARD NORTH.